United States Patent Office 3,114,709
Patented Dec. 17, 1963

3,114,709
PIPE THREAD LUBRICANT
Francis E. Chamberlin, Manhattan Beach, Calif., assignor to California Research Corporation, San Francisco, Calif., a corporation of Delaware
No Drawing. Filed Feb. 1, 1961, Ser. No. 86,287
5 Claims. (Cl. 252—23)

This invention is directed to lubricants particularly useful for application to pipe threads and the like to prevent freezing, galling, and stripping of pipe thread joints and the pipe threads.

This application is a continuation-in-part of patent application Serial No. 822,214, filed June 23, 1959, now Patent No. 3,007,866.

In the drilling of oil wells, particularly when rotary drilling equipment is used, the threaded joints of the pipes are under considerable load. In addition, drill pipes are usually under water or mud slurries. Under such conditions it is an essential requirement that drill pipe lubricant compositions adhere to the threaded joints to prevent the joints from freezing together, to permit the joints to be separated without too great difficulty and yet not be easily disconneced when being removed or lowered from or to drilling operations.

Furthermore, in the construction of oil and natural gas pipe lines, difficulties have been encountered in that the threaded pipe joints, after being united together for a short time, tend to freeze or grip tightly. By this action, the threads seize and stripping and galling occur.

Numerous drill pipe lubricants currently being used consist of metal particles dispersed in a carrying medium; for example, dispersions of powdered lead in a lubricating base oil. A number of the drill pipe lubricants presently used contain one or more powdered metals dispersed in the base oil serving as a carrier medium. However, many of the pipe joints treated with these drill pipe lubricants have a tendency to freeze, permitting a stripping of the threads. Also, galling occurs; that is, metal is transferred from one pipe to the second pipe of the threaded joints. Also, once a joint has been opened for inspection, it is noted that the parts of the joints contain clear bright metal, indicating that no lubrication whatsoever was obtained at those particular clear bright portions.

In deep drilling, there exists high surface pressures, high temperatures, and heavy string loads on the casings and pipes which are used in drilling operations. Drill pipe lubricants of themselves must have adequate lubricating qualities to prevent galling during the makeup of the joints; they must not be too fluid at the high temperatures found in the drill operations, temperatures as high as 300 to 400° F.; they must be of such consistency that the operator can apply the lubricant with a brush, etc.

Therefore, it is a particular object of this invention to provide drill pipe lubricating compositions which will permit ease of separation of the pipe joints without galling, or stripping, yet prevent the separation of the joints during drilling operations.

Thus, in accordance with this invention, it has been discovered that a drill pipe lubricant obviating the above noted disadvantages is obtained by thickened lubricating oil compositions comprising oils of lubricating viscosity, calcium soaps of fatty acids containing from 10 to 22 carbon atoms, calcium acetate, basic lead carbonate, excess base expressed as calcium hydroxide, and graphite. As described further hereinbelow, the calcium acetate may be replaced in part by calcium carbonate.

Thus, the drill pipe lubricants of this invention comprise oils of lubricating viscosity, calcium soaps of fatty acids containing from 10 to 22 carbon atoms, basic lead carbonate, excess base expressed as calcium hydroxide, graphite, calcium acetate, and, in certain instances, calcium carbonate.

The drill pipe lubricants of the present invention are especially applicable to threaded members such as found on drill pipes and line pipes, casings, tool joints and other threaded pipe connections which are used for pipe lines and which are used in the drilling of wells. These new drill pipe lubricants have particular advantages at high temperatures found in the earth during drilling operation; such as temperatures in the range of about 300° F. and greater. Furthermore, whereas drill pipe lubricants in general fail when used under conditions of extreme compression, the drill pipe lubricants described herein are effective for such service. For example, because of the different service requirements, two separate lubricants are usually required for the lubrication of drill pipe threads and drill collar threads. Whereas drill pipe threads are under tension, the drill collar threads are under compression. However, the lubricant described herein in this invention is effective for the lubrication of both of these pipe drilling assemblies, that is, this lubricant is used for the lubrication of drill pipe threads and drill collar threads.

Calcium soaps of fatty acids containing from 10 to 22 carbon atoms, more particularly from 12 to 18 carbon atoms, are oil thickening agents which are effective in the formation of drill pipe lubricants described herein. Such thickening agents may be exemplified by the calcium soaps of capric acid, lauric acid, myristic acid, palmitic acid, oleic acid, stearic acid, 12-hydroxy-stearic acid, hydrogenated ricinoleic acid, arachidic acid, behenic acid, etc.

Although the grease compositions have amounts of base (i.e., calcium hydroxide) in excess of that necessary for the neutralization of the acidic components used in the preparation of the grease, such base need not be present in the finished grease as calcium hydroxide. Although this excess base is expressed herein as free calcium hydroxide, such base may form basic salts, for example, basic calcium carbonate, basic calcium acetate, and basic calcium 12-hydroxy stearate. However, no theory is postulated herein to explain the possibility of basic salt formation.

The calcium soaps of the high molecular weight fatty acids, that is fatty acids containing from 10–22 carbon atoms, are present in the drill pipe lubricants in amounts of 0.5% to 10%, by weight, preferably, from 1% to 5%, by weight.

The calcium acetate is present in amounts from 1% to 10%; 2.5% to 8%, by weight, being preferred. When calcium carbonate is present in the composition, the maximum amount which can be present is such that the weight ratio of calcium carbonate to calcium acetate is from 3:1 to 1:1 that is, the weight ratio of calcium carbonate to calcium acetate can have a maximum value of 3. However, the sum of the total amounts of calcium acetate and calcium carbonate does not exceed the amounts expressed hereinabove for calcium acetate alone.

By "basic lead carbonate" is meant the lead carbonate of the formula, $2PbCO_3.Pb(OH)_2$, otherwise known as "white lead" to the paint industry. This white lead is used in amounts of 3% to 15%, by weight, preferably 3% to 7%, by weight.

The graphite which is used is preferably free from grit and other abrasives or deleterious materials. The graphite is used in amounts of 10% to 50%, by weight, of the final composition; 25% to 30% being preferred.

For the desired characteristics of the final drill pipe lubricant compositions, it is essential that the above named components be present in the compositions in certain proportions with respect to each other. For example, it is essential that the mol ratio of the total amount of calcium acetate and calcium carbonate present to the amount of the calcium soap of the fatty acids present is from 5 to 1 to 40 to 1 preferably 8:1 to 15:1; that is, that the mol ratio of the sum of calcium acetate and calcium carbonate present to the calcium soap of fatty acid present has values from 5 to 40 preferably from 8 to 15.

The calcium carbonate may be present as a component in this lubricant added directly as calcium carbonate. On the other hand, the calcium carbonate may be prepared in situ by the reaction of urea with calcium hydroxide during the preparation of the lubricant. The amount of urea used is based on the formation of calcium carbonate by the reaction of 1 mol of urea with 1 mol of calcium hydroxide.

It is essential that the excess base is present in amounts of 0.1% to 5.0%, expressed as calcium hydroxide.

Particularly preferred grease compositions in which graphite and white lead may be incorporated to form the drill pipe lubricants herein are described in Dreher U.S. patent application Serial No. 771,186, filed November 3, 1958. As described therein, such grease compositions are obtained by blending an oil of lubricating viscosity, a calcium soap of 12-hydroxy stearic acid (or its equivalent) (in amounts sufficient to thicken said oil to the consistency of a grease), calcium acetate in amount of 2 mols to 5 mols for each mol of calcium 12-hydroxy stearate, excess base expressed as calcium hydroxide, and calcium carbonate, which calcium carbonate is obtained by reacting urea with calcium hydroxide. Such grease compositions are preferably hydrous.

Lubricating oils which are suitable as base oils for the drill pipe lubricants of this invention include a wide variety of oils, such as mineral oils, as exemplified by the naphthenic base, paraffin base, and mixed base oils derived from petroleum, including lubricating oils derived from coal, etc.

The base oils are used in amounts sufficient to provide an easily applicable lubricating composition; that is, a drill pipe lubricant which can be smeared on the threaded pipe ends readily.

The compositions of this invention can be prepared in a conventional manner, and the order of addition of the components is generally not critical, following the grease manufacturing procedures well known to those skilled in the art. Such procedures include that of blending a calcium soap of a fatty acid, a base oil, and heating the blend with stirring to obtain a uniform dispersion of the soap in the oil. The mixture is then heated to a temperature of about 180° F., which the white lead, graphite and acetic acid and excess lime can be added; agitating the whole mixture for a period of time sufficient to obtain a smooth dispersion, after which the urea can be added, and the mixture heated to a temperature of about 320° F., under a pressure of 70 to 95 p.s.i. This pressure range, which is not critical, is maintained by bleeding into the atmosphere the ammonium formed during the conversion of the urea. The mixture is then heated to about 320° F. at atmospheric pressure for the purpose of completing the reaction.

If so desired, the white lead and graphite may be blended in the oil prior to the heating of the oil-calcium-fatty acid soap blend.

The examples hereinbelow illustrate the preparation of the base grease compositions to which the graphite is added forming the drill pipe lubricants of this invention.

EXAMPLE I

A mixture of 1106 pounds of methyl, 12-hydroxy stearate and about 4800 pounds of a California solvent refined paraffinic base oil having a viscosity of 480 SSU at 100° F. was heated to a temperature of 130° F. 2100 pounds of hydrated lime was then added and the mixture was agitated at 130° F. for a period of time sufficient to form a uniform blend. The whole mixture was heated to 180° F. and maintained at that temperature for a period of 30 minutes, after which 1120 pounds of acetic acid was added slowly during a period of 30 to 45 minutes. 1100 pounds of the same oil described hereinabove was then added, after which there was added 308 pounds of urea, and the mixture was heated to 320° F. at a pressure of 70–90 p.s.i. for a period of one hour. The whole mixture was then heated at 330° F. at atmospheric pressure for a period of one hour, after which an additional 4800 pounds of oil was added.

The data set forth hereinbelow in Table I show that compositions described herein are markedly effective as drill pipe lubricants.

The test data were obtained by smearing the joints of 5 inch pipe with the lubricant to be tested, then following procedure outlined hereinbelow as follows:

(1) Making connections by subjecting the connection to a torque of 5,000 foot-pounds;
(2) Heating the connection at 400° F. for 12 hours;
(3) Cooling and applying a torque of 5,000 foot-pounds;
(4) Storing connection at room temperature for about 224 hours;
(5) Heating at 400° F. for 12 hours;
(6) Cooling and applying a torque of 5,000 foot-pounds;
(7) Storing at room temperature for 128 hours;
(8) Heating at 400° F. for 12 hours;
(9) 3 cycles each of:
   (a) Cooling and applying a torque of 5,000 foot-pounds;
   (b) Storing at room temperature for 152 hours;
   (c) Heating at room temperature for 12 hours;
(10) Cooling and applying a torque of 5,000 foot-pounds;
(11) Storing at room temperature for 56 hours;
(12) Heating to 200° F., then disassembled.

The foot-pounds of torque required to break the connection was recorded.

These alternate heating and cooling cycles of this test coordinate with actual drilling rig operations.

*Table I*

| Lubricant Number | 1 | 2 | 3 |
| --- | --- | --- | --- |
| Composition, Wt. percent [1]: | | | |
| 12-Hydroxy Stearic Acid | 3.2 | | |
| Methyl 12-hydroxystearate | | 2.90 | 2.90 |
| Acetic Acid | 3.3 | 2.94 | 2.94 |
| Urea | 0.9 | 0.80 | 0.80 |
| Hydrated Lime | 6.3 | 5.50 | 5.50 |
| Sodium Hydroxide [2] | | 0.04 | 0.04 |
| Mineral Oil [3] | 60.3 | 66.82 | 71.82 |
| Powdered Graphite | 26.1 | 11.00 | 11.00 |
| White Lead [4] | | 10.00 | 5.00 |
| Test Results: | | | |
| ASTM Worked Penetration ($P_{60}$) | 365 | 363 | 366 |
| Breaking Torque, Foot-Pounds | 4,800 | 4,100 | 4,000 |

[1] Components used in preparation of drill pipe lubricants.
[2] Catalyzed formation of calcium 12-hydroxy stearate.
[3] A California paraffinic base oil having a viscosity of 480 SSU at 100° F.
[4] 90% white lead—10% linseed oil.

When a commercially available drill pipe lubricant containing a 50%, by weight, zinc-graphite filler was evaluated in accordance with the above-described test procedure, the breaking torque was 5,000 foot-pounds.

These data readily show the marked advantage in using Lubricants Nos. 2 and 3, which exemplify the drill pipe lubricants of this invention.

Lubricant No. 3 described hereinabove was used as a drill pipe lubricant in the drilling of several oil wells in California oil fields. The wells were drilled beyond the depths of 10,000 feet. The drill pipe lubricant performed excellently at all times, and in all instances all of the joints broke without difficulty. Furthermore, when necessary, the drill collars were readily unthreaded without any difficulty whatsoever.

I claim:

1. A pipe thread lubricant consisting essentially of an oil of lubricating viscosity, from 0.5% to 10%, by weight, of a calcium salt of a fatty acid containing from 10 to 22 carbon atoms, from 1% to about 10%, by weight, of calcium acetate, from 0.1% to 5%, by weight, of base expressed as calcium hydroxide, from 3% to 15%, by weight, of white lead, and from 10% to 50%, by weight, of graphite.

2. A pipe thread lubricant consisting of essentially of an oil of lubricating viscosity, from 1% to 5%, by weight, of a calcium salt of a fatty acid containing from 10 to 22 carbon atoms, from 1% to about 10%, by weight, of calcium acetate, from 0.1% to 5%, by weight, of base expressed as calcium hydroxide, from 3% to 7%, by weight, of white lead, and from 20% to 30%, by weight, of graphite.

3. A pipe thread lubricant consisting essentially of an oil of lubricating viscosity, from 0.5% to 10%, by weight, of a calcium salt of a fatty acid containing from 10 to 22 carbon atoms, calcium acetate, calcium carbonate, from 0.1% to 5%, by weight, of base expressed as calcium hydroxide, from 3% to 7%, by weight, of white lead, and from 10% to 50%, by weight, of graphite, wherein the total amount of calcium acetate plus calcium carbonate is equal to from 1% to about 10%, by weight.

4. A pipe thread lubricant consisting essentially of an oil of lubricating viscosity, from 0.5% to 10%, by weight, of a calcium salt of a fatty acid containing from 10 to 22 carbon atoms, calcium acetate, calcium carbonate, from 0.1% to 5%, by weight, of base expressed as calcium hydroxide, from 3% to 7%, by weight, of white lead, and from 10% to 50%, by weight, of graphite, wherein the total amount of calcium acetate plus calcium carbonate is equal to from 1% to about 10%, by weight, and said calcium carbonate is present in an amount such that the weight ratio of calcium carbonate to calcium acetate has a maximum value of 3.

5. The pipe thread lubricant of claim 4 wherein said calcium salt of fatty acid is calcium 12-hydroxy stearate.

References Cited in the file of this patent
UNITED STATES PATENTS
3,007,866     Chamberlin _____ Nov. 7, 1961

UNITED STATES PATENT OFFICE
CERTIFICATE OF CORRECTION

Patent No. 3,114,709                                December 17, 1963

Francis E. Chamberlin

It is hereby certified that error appears in the above numbered patent requiring correction and that the said Letters Patent should read as corrected below.

Column 3, line 51, after "180° F.," insert -- after --; column 5, line 12, for "20%" read -- 25% --.

Signed and sealed this 26th day of May 1964.

(SEAL)
Attest:

ERNEST W. SWIDER                            EDWARD J. BRENNER
Attesting Officer                                Commissioner of Patents